United States Patent
Liu et al.

(10) Patent No.: US 10,356,802 B2
(45) Date of Patent: Jul. 16, 2019

(54) BASE STATION AND SCHEDULING METHOD OF UPLINK RESOURCE UNIT

(71) Applicant: Industrial Technology Research Institute, Hsinchu (TW)

(72) Inventors: Pei-Yi Liu, Taichung (TW); Kun-Ru Wu, Kaohsiung (TW); Jia-Ming Liang, Taoyuan (TW); Jen-Jee Chen, Tainan (TW); Yu-Chee Tseng, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 70 days.

(21) Appl. No.: 15/847,930

(22) Filed: Dec. 20, 2017

(65) Prior Publication Data
US 2019/0191446 A1  Jun. 20, 2019

(51) Int. Cl.
| H04L 12/28 | (2006.01) |
| H04W 72/12 | (2009.01) |
| H04W 72/04 | (2009.01) |
| H04W 52/26 | (2009.01) |
| H04W 28/02 | (2009.01) |

(52) U.S. Cl.
CPC ... *H04W 72/1231* (2013.01); *H04W 28/0268* (2013.01); *H04W 52/26* (2013.01); *H04W 72/0473* (2013.01); *H04W 72/1284* (2013.01); *H04W 72/0453* (2013.01)

(58) Field of Classification Search
None
See application file for complete search history.

(56) References Cited

U.S. PATENT DOCUMENTS

| 8,929,239 B2 | 1/2015 | Tabet et al. |
| 9,743,406 B2 | 8/2017 | Chen et al. |

(Continued)

FOREIGN PATENT DOCUMENTS

| CN | 101127700 | 2/2008 |
| CN | 107197521 | 9/2017 |

(Continued)

OTHER PUBLICATIONS

"Search Report of European Counterpart Application," dated Jun. 29, 2018, pp. 1-10.

(Continued)

*Primary Examiner* — Noel R Beharry
*Assistant Examiner* — Lionel Preval
(74) *Attorney, Agent, or Firm* — JCIPRNET

(57) ABSTRACT

A scheduling method of uplink resource unit includes selecting an uplink parameter set, by calculating the uplink parameter set capable of achieving a minimized energy consumption according to a traffic and a QoS of a user equipment (UE). The uplink parameter set allows a plurality of transmission variations. A score function is used to calculate a score of a transmission condition variation of the UE and a transmission order of the UE is determined according to the score. A disposing position of the resource units in uplink subcarriers is determined. The time occupied by the disposing position is checked to see whether or a delay constraint allowed by the UE is satisfied. If the result of checking the disposing position does not satisfy the delay constraint, the number of consecutive subcarriers is changed and the step of determining the disposing position of the resource units in the uplink subcarriers is repeatedly performed.

16 Claims, 15 Drawing Sheets

(56) References Cited

U.S. PATENT DOCUMENTS

| | | | |
|---|---|---|---|
| 2017/0064694 A1 | 3/2017 | Wang et al. | |
| 2017/0201393 A1 | 7/2017 | Gaal et al. | |
| 2017/0201963 A1 | 7/2017 | Zhang et al. | |
| 2017/0265171 A1 | 9/2017 | Rico Alvarino et al. | |

FOREIGN PATENT DOCUMENTS

| | | |
|---|---|---|
| KR | 20090031181 | 3/2009 |
| TW | M318851 | 9/2007 |
| TW | I349470 | 9/2011 |
| TW | I427958 | 2/2014 |
| TW | 201728113 | 8/2017 |
| WO | 2015028843 | 3/2015 |
| WO | 2017039372 | 3/2017 |
| WO | 2017039374 | 3/2017 |
| WO | 2017108111 | 6/2017 |
| WO | 2017119720 | 7/2017 |
| WO | 2017121619 | 7/2017 |

OTHER PUBLICATIONS

Y.-P. Eric Wang et al., "A Primer on 3GPP Narrowband Internet of Things", IEEE Communications Magazine, Mar. 2017, pp. 117-123.
Sung-Min Oh et al., "An Efficient Small Data Transmission Scheme in the 3GPP NB-IoT System", IEEE Communications Letters, Mar. 2017, pp. 660-663.
Rapeepat Ratasuk et al., "NB-IoT System for M2M Communication", Wireless Communications and Networking Conference Workshops (WCNCW), Apr. 2016, pp. 1-5.
Changsheng Yu et al., "Uplink Scheduling and Link Adaptation for Narrowband Internet of Things Systems", IEEE Access 5, Feb. 2017, pp. 1724-1734.
Nitin Mangalvedhe et al., "NB-IoT Deployment Study for Low Power Wide Area Cellular IoT", IEEE 27th Annual International Symposium on Personal, Indoor, and Mobile Radio Communications (PIMRC), Sep. 2016, pp. 1-6.
Rapeepat Ratasuk et al., "Overview of Narrowband IoT in LTE Rel-13", IEEE Conference on Standards for Communications and Networking (CSCN), Oct. 2016, pp. 1-7.
"Office Action of Taiwan Counterpart Application," dated Sep. 7, 2018, pp. 1-3.

BASE STATION AND SCHEDULING METHOD OF UPLINK RESOURCE UNIT

BACKGROUND OF THE INVENTION

1. Field of the Invention

The disclosure relates to a wireless communication technique, and more particularly, to a scheduling method of uplink resource unit.

2. Description of Related Art

The wireless communication technology occupies an important proportion in modern technology. With continuous research and development in technology, an uplink resource allocation scheduling technology for the Internet of Things/mobile devices in Narrow_Band Internet of Thing (NB-IoT) in the field of 5G network communication has been proposed as a technology for enhancing reliability of devices in uploading data while reducing overall device power consumption by utilizing an integrated approach of repetition mechanism, radio resource allocation, modulation and transmit power configuration.

NB-IoT is expected to be one of promising IoT application technologies in the future, which can be easily deployed with use of existing network to support a large number of IoT devices for accessing networks and provide low cost and low energy transmission for extending battery life. Increasing the coverage and reliability by using repetition and multi-type resource unit (RU).

For NB-IoT-based technology, further research and development on an uplink data transmission method for achieving high reliability and energy-saving are still required.

SUMMARY OF THE INVENTION

The disclosure provides a base station and a scheduling method of uplink resource unit executed by the base station, which are capable of achieving a favorable uploading quality.

In an embodiment of the disclosure, a scheduling method of uplink resource unit between a user equipment and a base station server system in Narrow Band Internet of Thing (NB-IoT) includes: calculating an uplink parameter set having a minimized energy consumption according to a traffic and a QoS allowed by the user equipment, wherein the uplink parameter set comprises parameters of a plurality of allowed transmission variations including a number of scheduled resource units ($N^{RU}$), a number of repetitions ($N^{rep}$), a number of consecutive subcarriers ($N^{SC}$) used by the resource units and a modulation coding scheme (MCS). A score of a transmission condition variation of the user equipment is calculated by using a score function and a transmission order of the user equipment is determined according to the score. A disposing position of the resource units in uplink subcarriers is determined such that a remaining area of effective resource units is minimized. A transmission time of the disposing position is checked, and the number of consecutive subcarriers is changed when the transmission time does not satisfy a delay constraint. Here, the step of determining the disposing position of the resource units in the uplink subcarriers is looped back and performed with an energy consumption used by the resource unit being not changed as a higher priority, and an uplink resource unit scheduling is completed when the checking result satisfies the delay constraint.

In an embodiment of the disclosure, a base station server system includes: a processor, configured to perform a management on a communication of the base station with a user equipment; a storage apparatus, at least storing firmware or software required by the management performed by the processor; a buffer memory device, configured to temporarily store data required in operations of the processor; and a communication interface, providing an interface for communicating with the user equipment. Here, according to an NB-IoT specification, the processor performs an uplink resource unit scheduling, including calculating an uplink parameter set having a minimized energy consumption according to a traffic and a Quality of Service (QoS) allowed by the user equipment. Here the uplink parameter set comprises parameters of a plurality of allowed transmission variations including a number of scheduled resource units ($N^{RU}$), a number of repetitions ($N^{rep}$), a number of consecutive subcarriers ($N^{SC}$) used by the resource units and a modulation coding scheme (MCS). A score of a transmission condition variation of the user equipment is calculated by using a score function and a transmission order of the user equipment is determined according to the score. A disposing position of the resource units in uplink subcarriers is determined such that a remaining area of effective resource units is minimized. A transmission time of the disposing position is checked, and the number of consecutive subcarriers is changed when the transmission time does not satisfy a delay constraint. Here, the step of determining the disposing position of the resource units in the uplink subcarriers is looped back and performed with an energy consumption used by the resource unit being not changed as a higher priority, and an uplink resource unit scheduling is completed when the checking result satisfies the delay constraint.

To make the above features and advantages of the present disclosure more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
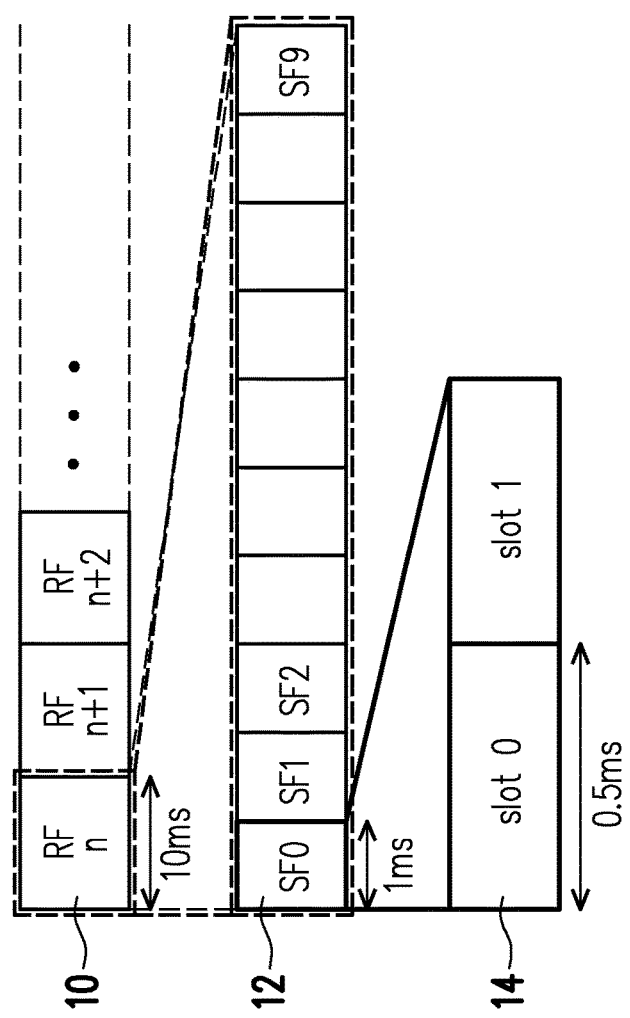
FIG. 1 is a schematic diagram illustrating a data structure of NB-IoT according to an embodiment of the disclosure.

Reference will now be made in detail to the present preferred embodiments of the invention, examples of which are illustrated in the accompanying drawings. Wherever possible, the same reference numbers are used in the drawings and the description to refer to the same or like parts.

The disclosure proposes a scheduling method of resource unit during an uplink transmission in an NB-IoT specification, which can improve transmission quality including reliability enhancement and energy loss reduction.

Several embodiments are provided below to describe the disclosure, but the disclosure is not limited by the provided embodiments.

In the followings, the NB-IoT specification is described first so the resource units can be scheduled better after understanding variations allowed by the NB-IoT specification. FIG. 1 is a schematic diagram illustrating a data structure of NB-IoT according to an embodiment of the disclosure.

Referring to FIG. 1, a data frame of NB-IoT is composed of a plurality of radio frames (RF) 10. One radio frame 10 takes 10 ms time. One radio frame 10 is further divided into ten subframes (SF) 12 per 1 ms. One subframe 12 is further divided into two slots 14. One slot occupies 0.5 ms.

Figure 2:
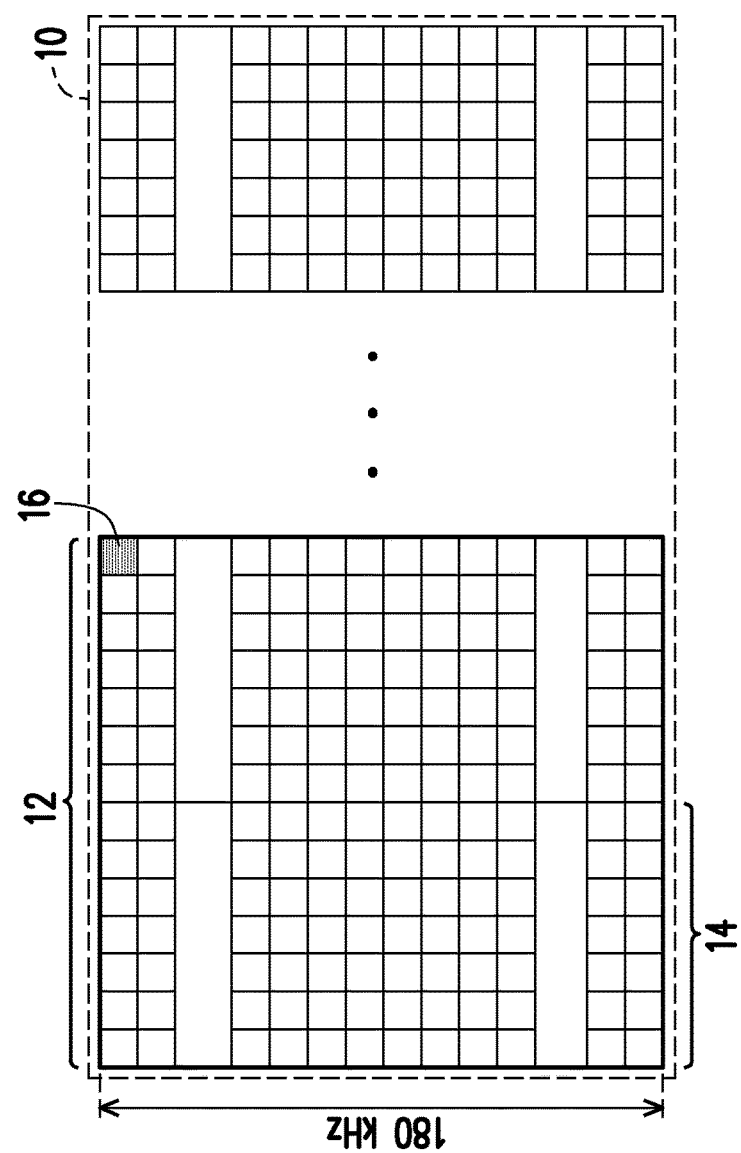
FIG. 2 is a schematic diagram illustrating a resource format of NB-IoT according to an embodiment of the disclosure.

FIG. 2 is a schematic diagram illustrating a resource format of NB-IoT according to an embodiment of the disclosure. Referring to FIG. 2, a detailed format of one radio frame 10 is composed of a plurality of resource elements (RE) 16 as the minimum elements. Specifically, a bandwidth used by the radio frame 10 is 180 kHz and a bandwidth of a subcarrier (SC) is 15 kHz so there are twelve subcarriers in total. One subcarrier is used by one resource element 16. The horizontal axis refers to time factor. One slot 14 is divided into seven symbols within 0.5 ms. Each symbol is used by one resource element 16. In other words, one session and one subcarrier define one resource element 16. Further, two slots 14 constitute one subframe 12. Ten subframes 12 constitute one radio frame 10.

Figure 3:
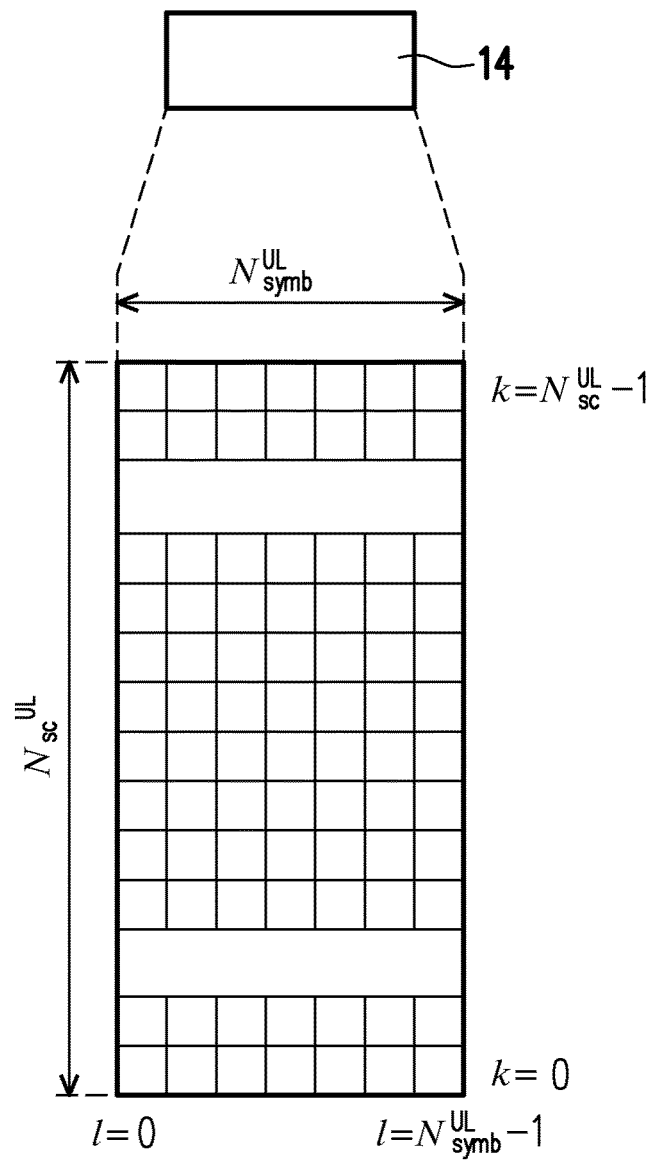
FIG. 3 is a schematic diagram illustrating a configuration of resource units in one uplink slot according to an embodiment of the disclosure.

FIG. 3 is a schematic diagram illustrating a configuration of resource elements in one uplink slot according to an embodiment of the disclosure. Referring to FIG. 3, a plurality of parameters is defined for the frame 14. $N_{SC}^{UL}$ is a number of uplink (UL) subcarriers, and k represents a serial number thereof. One resource element 16 transmits data of one symbol (symb). $N_{symb}^{UL}$ is a number of the resource elements 16, and l represents a serial number thereof.

During the uplink transmission, possible options are shown by Table 1.

TABLE 1

| Format | Bandwidth (Δf) | $N_i^{SC}$ | $N_i^{slot}$ | $N_{symb}^{UL}$ |
|---|---|---|---|---|
| 1 | 3.75 kHz | 1 | 16 | 7 |
|   | 15 kHz | 1 | 16 | |
|   |   | 3 | 8 | |
|   |   | 6 | 4 | |
|   |   | 12 | 2 | |
| 2 | 3.75 kHz | 1 | 4 | |
|   | 15 kHz | 1 | 4 | |

$N_i^{SC}$ is a number of consecutive subcarriers used by the resource unit in the uplink transmission.

$N_i^{slot}$ is a number of consecutive slots used by the resource unit in the uplink transmission.

$N_{symb}^{UL}$ is a number of the resource elements used by the slot.

Figure 4:
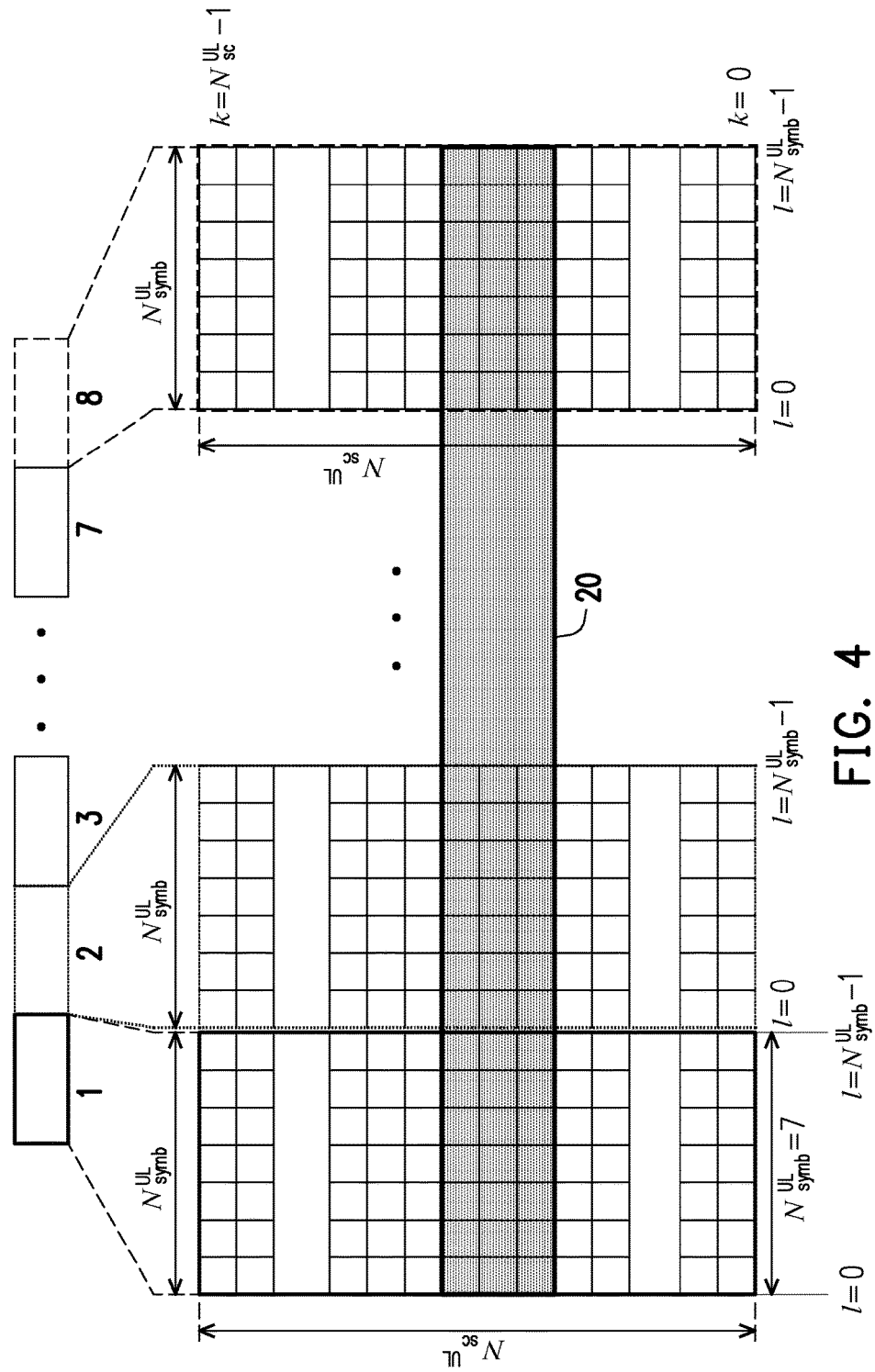
FIG. 4 is a schematic diagram illustrating a configuration of resource units when an uplink transmission is performed using the resource units in three consecutive subcarriers according to an embodiment of the disclosure.

FIG. 4 is a schematic diagram illustrating a configuration of resource units when an uplink transmission is performed using the resource units in three consecutive subcarriers according to an embodiment of the disclosure. Referring to FIG. 4, a resource unit type (RU type) is provided using a transmission method with three consecutive subcarriers and eight slots as an example, in which a disposing position of a resource unit type 20 thereof is shown in the drawing. The subcarrier is also known as "tone", and thus the resource unit type of the present embodiment is of a "3 tones" type. Based on the options in Table 1, the "3 tones" type includes $N_i^{SC}=3$, $N_{symb}^{UL}=7$, $N_i^{slot}=8$ and Δf=15 kHz. In addition, its format is of a type 1.

Figure 5:
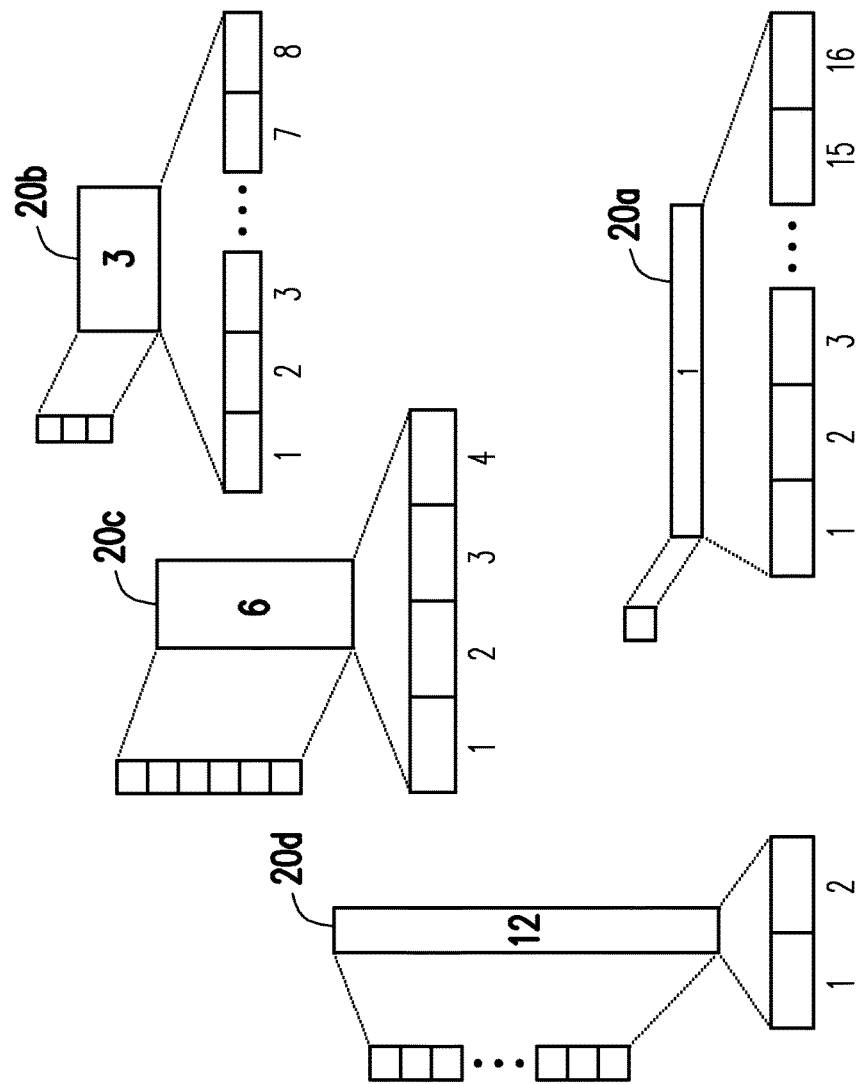
FIG. 5 is a schematic diagram illustrating four types of the resource units with a subcarrier bandwidth of 15 kHz in an NB-IoT specification according to an embodiment of the disclosure.

FIG. 5 is a schematic diagram illustrating four types of the resource units with a subcarrier bandwidth of 15 kHz in an NB-IoT specification according to an embodiment of the disclosure. Referring to FIG. 5, according to the NB-IoT, when the bandwidth of the subcarrier is selected to be 15 kHz, a total of twelve subcarriers can be used and the resource unit type includes four options including single tone, 3 tones, 6 tones and 12 tones. A resource unit type 20a is of the single tone using sixteen slots. A resource unit type 20b is of the 3 tones using eight slots. A resource unit type 20c is of the 6 tones using four slots. A resource unit type 20d is of the 12 tones using two slots. As for a number of data size units, 16 units are used in the case of the single tone, and 24 units are used in other cases of 3 tones, 6 tones and 12 tones.

Under the framework of the above specification, the disclosure can schedule uplink resource allocation to effectively use the bandwidth, save energy and maintain favorable transmission reliability.

In the disclosure, with use of the data size units, a number of scheduled data units ($N^{RU}$) may be estimated. A data size Di may be estimated by, for example, Equation (1) below.

$$N_i^{RU} = \begin{cases} \left\lceil \dfrac{D_i}{f(MCSi) \times 16} \right\rceil, & N_i^{SC} = 1 \\ \left\lceil \dfrac{D_i}{f(MCSi) \times 24} \right\rceil, & N_i^{SC} = 3, 6, 12 \end{cases} \quad (1)$$

wherein f(MCSi) is a predetermined function based on a modulation coding scheme (MCS).

Figure 6:
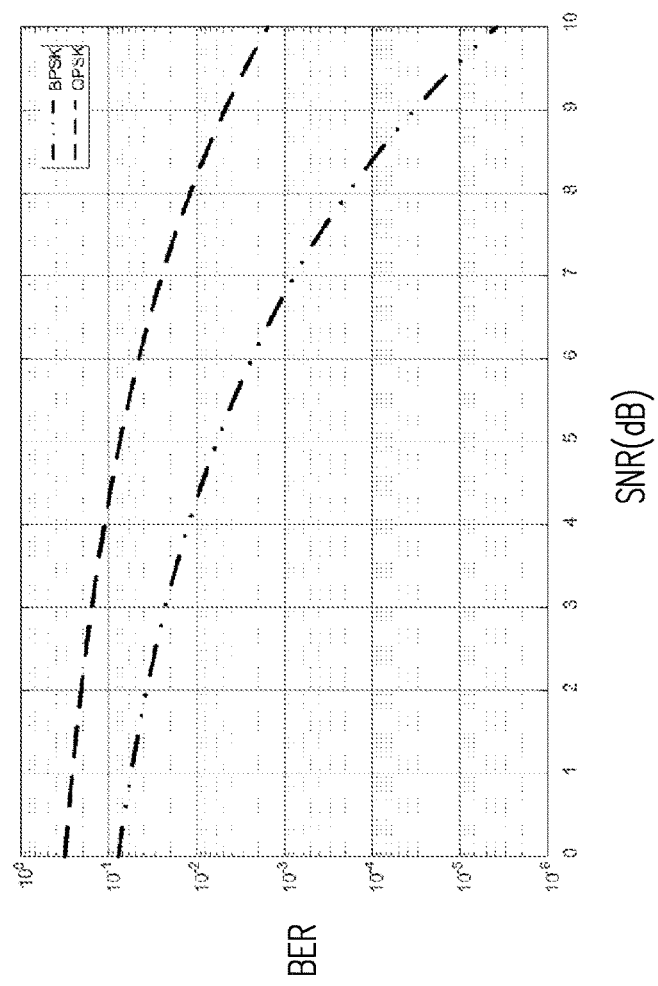
FIG. 6 is a schematic diagram illustrating a relation between a bit error rate and a received power signal-to-noise ratio.

FIG. 6 is a schematic diagram illustrating a relation between a bit error rate and a received power signal-to-noise ratio. Referring to FIG. 6, which provides a relation between a bit error rate (BER) and a received power. Considering the requirements for the bit error rate, a desired signal-to-noise ratio (SNR) may be obtained such that a power consumption generated when transmitting data may also be calculated according to theoretical rules. The power consumption is also taken into consideration of the disclosure. Here, the selected modulation coding scheme (MCS) is, for example, a binary phase shift modulation (BPSK) or a quadrature phase shift modulation (QPSK). The selected modulation coding scheme (MCS) may be used to calculate the signal-to-noise ratio (SNR). Here, a practical method used for calculating the power dissipation may be derived from theoretical rules instead of being limited only to the above. The complete calculating process is not described in the disclosure.

With various aforesaid adjustable factors taken into consideration, the disclosure proposes the scheduling method of uplink resource unit described in more details as follows.

Figure 7:
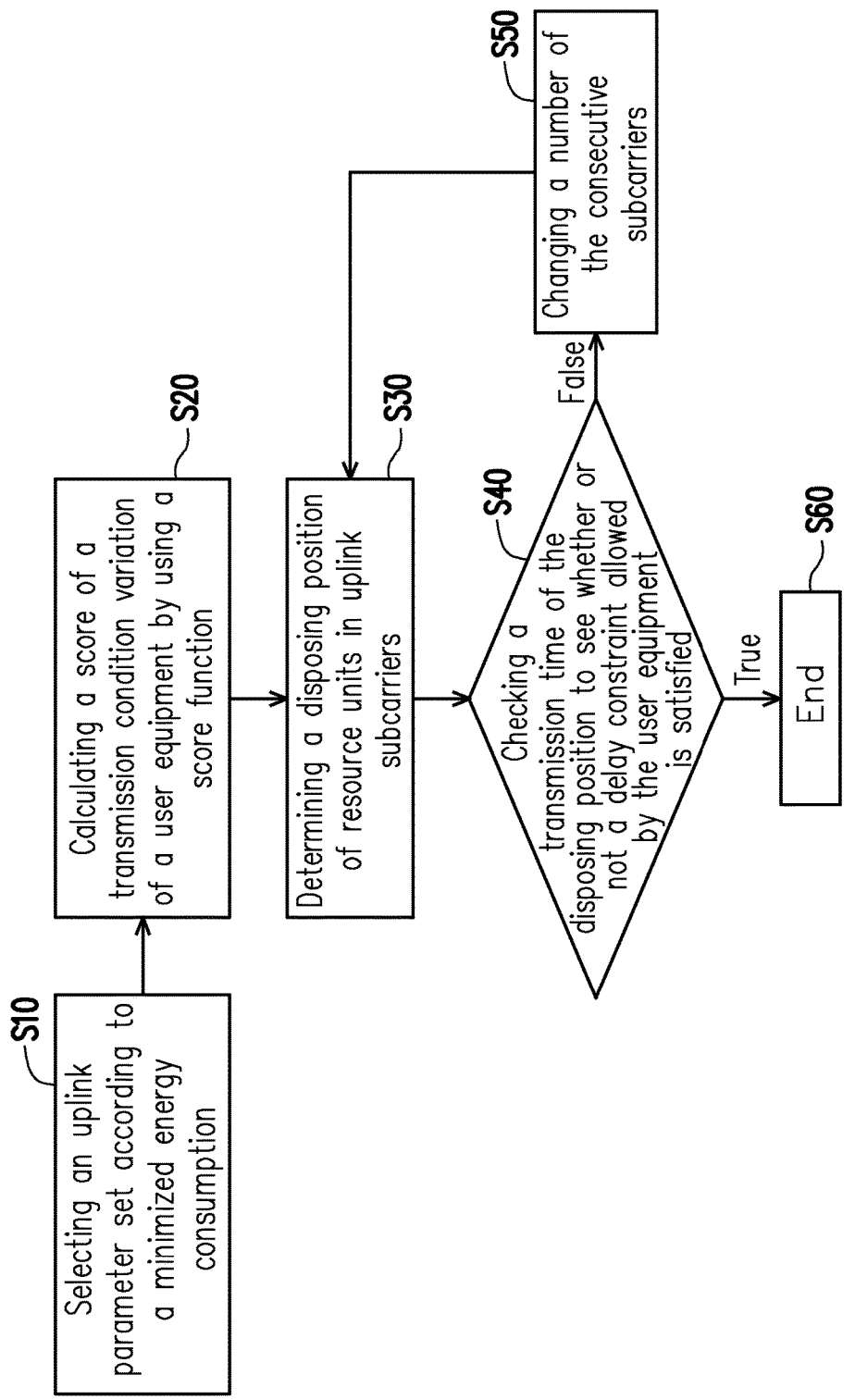
FIG. 7 is a flowchart illustrating a scheduling method of uplink resource unit according to an embodiment of the disclosure.
Figure 8A:
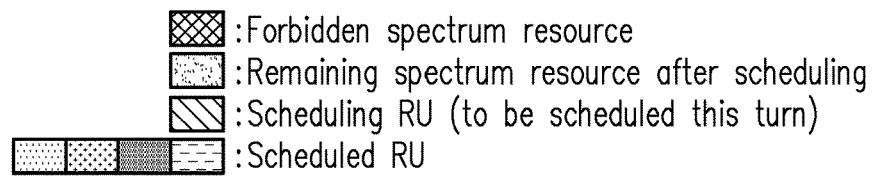
FIG. 8A to FIG. 8D are schematic diagrams illustrating a disposing mechanism of the resource units according to an embodiment of the disclosure.
Figure 8A:
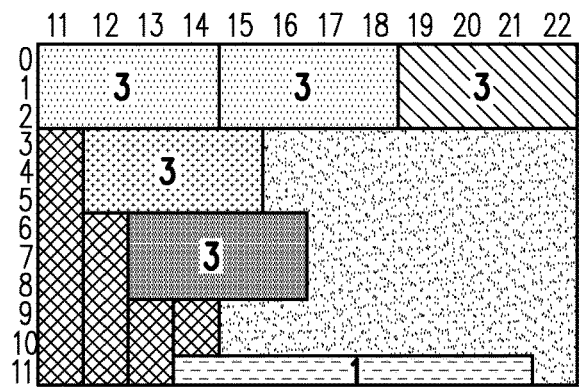
Figure 8B:
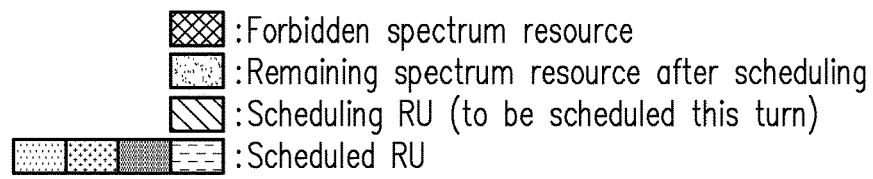
Figure 8B:
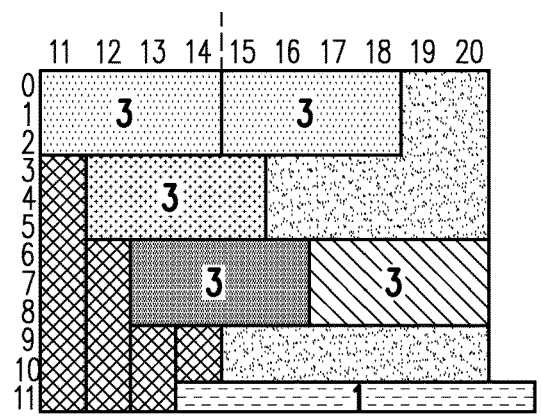
Figure 8C:
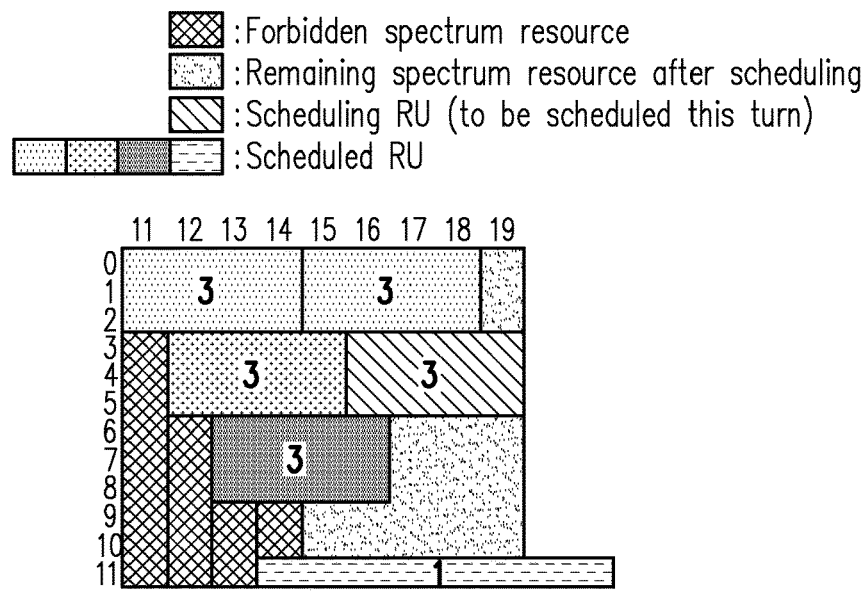
Figure 8D:
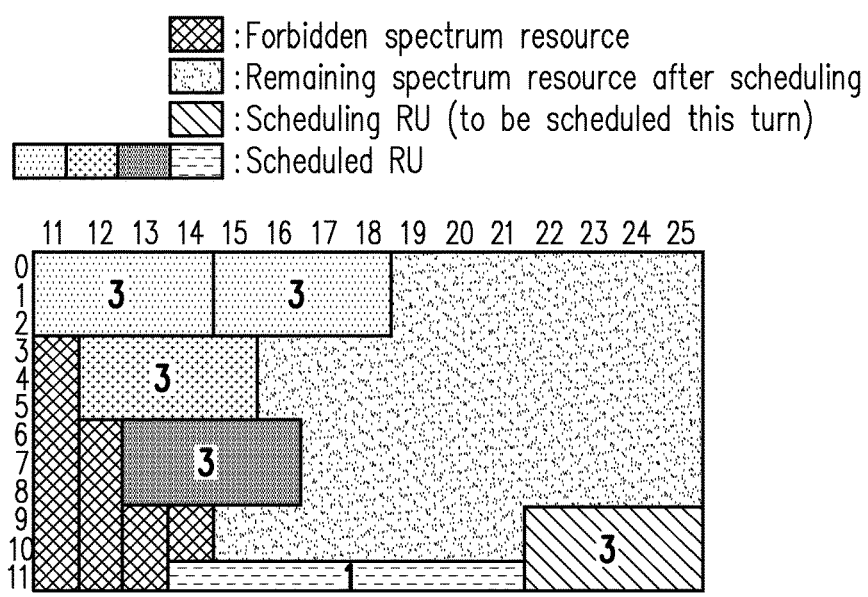
Figure 9A:
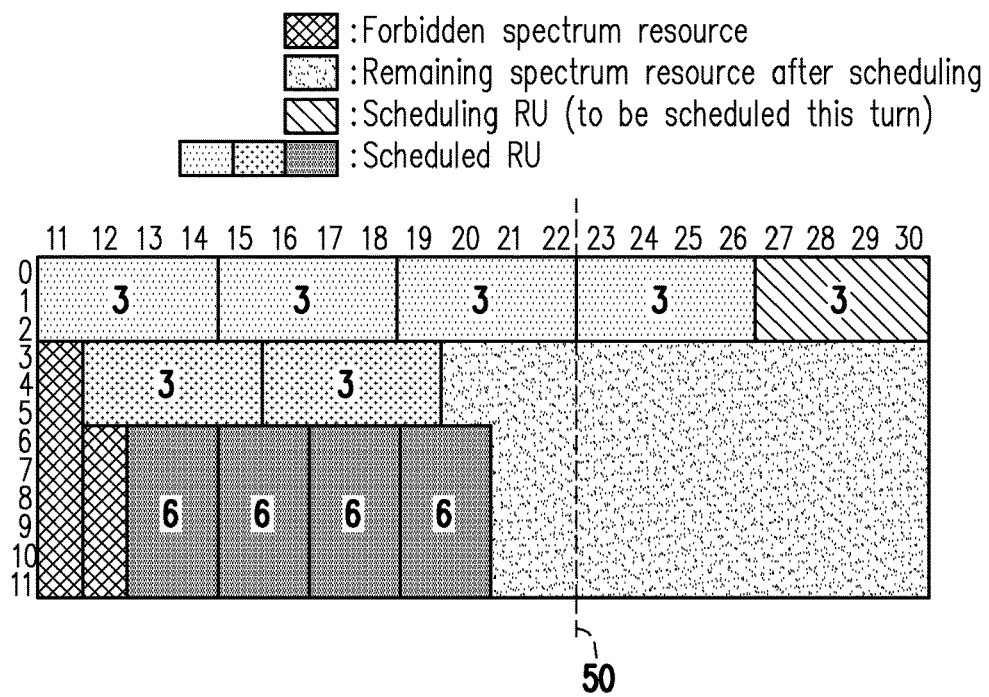
FIG. 9A to FIG. 9D are schematic diagrams illustrating a comparison between disposition of the resource units and allowed delay time according to an embodiment of the disclosure.
Figure 9B:
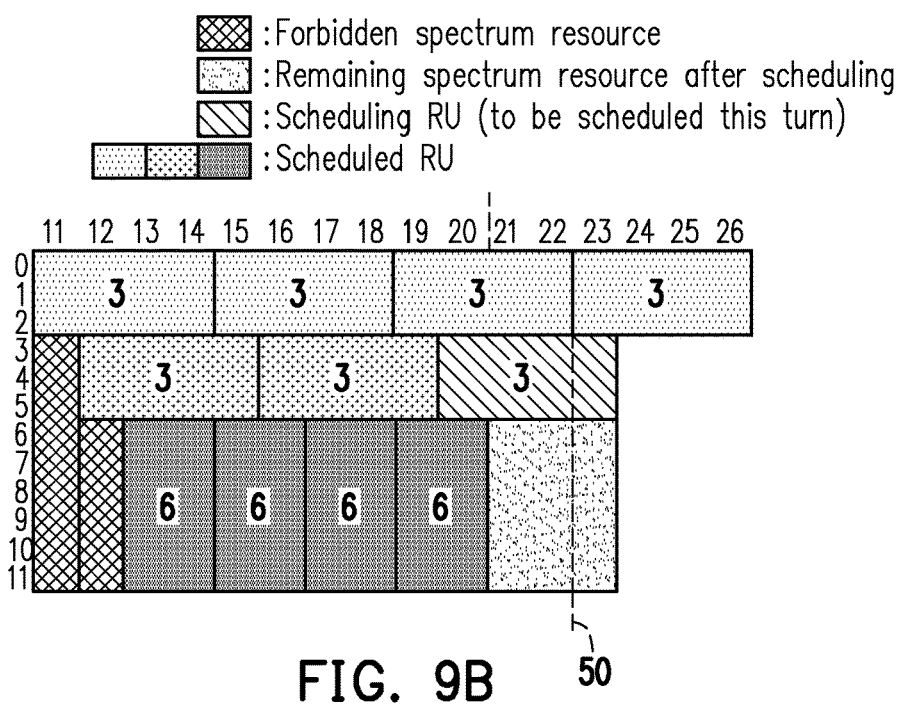
Figure 9C:
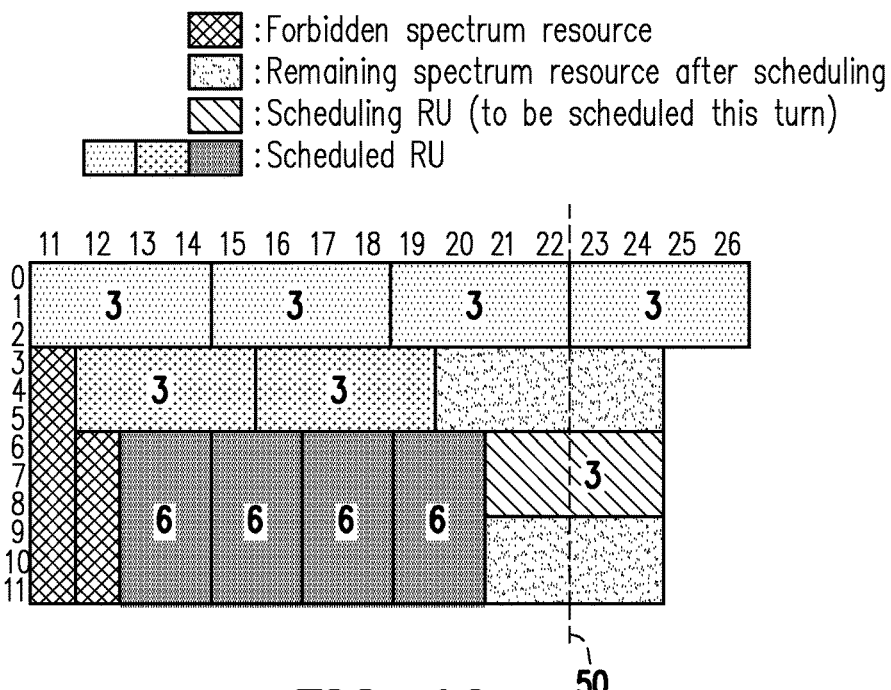
Figure 9D:
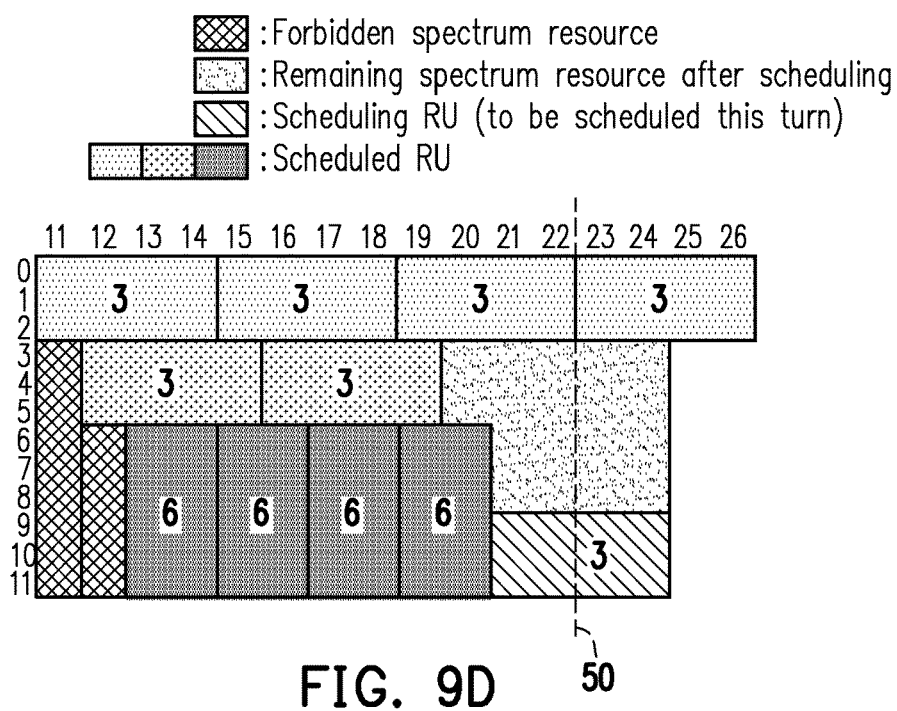

FIG. 7 is a flowchart illustrating a scheduling method of uplink resource unit according to an embodiment of the disclosure. Referring to FIG. 7, an embodiment of the disclosure provides a scheduling method of uplink resource unit, which is adapted to a communication via NB-IoT between a base station server system and a user equipment. The scheduling method of uplink resource unit includes a step S10 for selecting an uplink parameter set, which is found by calculating the uplink parameter set having a minimized energy consumption. In general, the uplink parameter set having the minimized energy consumption is calculated according to a traffic and a Quality of Service (QoS) allowed by the user equipment. The Quality of Service (QoS) here refers to a control mechanism predetermined for transmitting data via network that provides different corresponding priority levels to be adopted for different users or different data streams, or ensures that performance of the data stream reaches a certain level based on requirements from application. In addition, the uplink parameter set includes parameters of a plurality of allowed transmission variations including a number of scheduled resource units ($N^{RU}$), a number of repetitions ($N^{rep}$), a number of consecutive subcarriers used by a resource unit ($N^{SC}$) and a modulation coding scheme (MCS).

In other words, the resource unit type may be selected and a parameter set satisfying the BER and the repetitions may be calculated according to a tone number, a MCS and a reliability for each user equipment (UE).

In a step S20, a score function is used to calculate a score of a transmission condition variation of the user equipment and a transmission order of the user equipment is determined according to the score.

In a step S30, a disposing position of the resource units in uplink subcarriers is determined such that a remaining spectrum resource is minimized.

In a step S40, a transmission time of the disposing position is checked to see whether or not a delay constraint allowed by the user equipment is satisfied.

If a result of the step S40 is true, it means that a result of checking the disposing position satisfies the delay constraint and a step S60 (End) can be entered to complete an uplink resource unit scheduling.

If the result of checking the disposing position in the step S40 is false, i.e., when the transmission time does not satisfy the delay constraint, the number of the consecutive subcarriers ($N^{SC}$) is changed in a step S50. An effect of changing the number of consecutive subcarriers ($N^{SC}$) is equivalent to changing the resource unit type or changing the tone number. Then, the step S30 of determining the disposing position of the resource units in the uplink subcarriers is looped back and performed.

Moreover, if the scheduling cannot be completed simply by changing the number of consecutive subcarriers ($N^{SC}$), the method can go back to the step 20 in which a transmission configuration with a second highest score is selected for re-scheduling. In an embodiment, the method may also go back to the step S10 in which a configuration with a second highest energy consumption is selected. Those subsequent schedulings can still adopt the technique of the disclosure. For example, the minimized energy consumption in the step 10 will exclude the unavailable combinations which violate delay constrains.

Content of each step will be described in more details as follows. In the step S10, for example, according to Equation (1), the number of resource units $N_i^{RU}$ may be estimated according to a data size $D_i$ of an ith user equipment. Also, a successful transmission probability $P_i^S$ is may also calculated according to the bit error rate BER, as shown by Equation (2).

$$P_i^S = (1-BER_i)^{Di} \qquad (2)$$

Then, the number of repetitions $N_i^{REP}$ is calculated, as shown by Equation (3). The number of repetitions $N_i^{REP}$ needs to satisfy a requirement of Equation (3) to be greater than or equal of a reliability goal $R_i$ of the ith UE.

$$1-(1-P_i^S)^{N_i^{rep}} \geq R_i \qquad (3)$$

In addition, the selection of a received power $P_i$ needs to be greater than a lowest power consumption calculated according to FIG. 6 and less than a maximum power consumption $P_i^{max}$ of the UE.

Next, according to the previously obtained parameter values, an energy consumption Ei of Equation (4) is calculated.

$$E_i = P_i \times N_i^{slot} \times N_i^{RU} \times N_i^{rep} \qquad (4)$$

Afterwards, those having the lowest energy consumption Ei among the parameter values are found and used as an initial uplink parameter set through a calculation shown in Equation (5).

$$E_i^{min} = \min \Sigma_i E_i \qquad (5)$$

After the lowest energy consumption is found accordingly, it can be determined that the parameters including $N_i^{SC}$, $N_i^{slot}$, $N_i^{RU}$, $N_i^{rep}$ and $MCS_i$ have various options of 1/3/6/12. In the step S20, according to possible variation options in the transmission order of the user equipment, a higher flexibility can be provided for allowing variations to be adjusted later in a case of more options, which has a lower priority value. For instance:

In case of one option, a priority value (p)=4.
In case of two options, the priority value (p)=3.
In case of three options, the priority value (p)=2.
In case of more than three options, the priority value (p)=1.

Furthermore, if a time emergency is to be taken into consideration, an estimated value may also be obtained according to, for example, factors like a remaining time, etc. Then, the scores of the time emergency and the remaining time may be calculated according to weights $W_1$ and $W_2$, as shown by Equation (6):

$$(Score)_i = W_1 * (\text{priority value})_i + W_2 * (\text{time emergency})_i \qquad (6)$$

The scores are shown in Table 2:

TABLE 2

| $N_i^{SC}$ | $N_i^{RU}$ | $N_i^{rep}$ | $MCS_i$ | $Score_i$ |
|---|---|---|---|---|
| 3 | 1 | 2 | QPSK | 0.9 |
| 3 | 1 | 1 | BPSK | 0.5 |

Accordingly, the disclosure further selects a UE with higher score and corresponding parameter set which includes $N_i^{SC}=3$ and $N_i^{rep}=2$.

In the step S30, the resource units are practically disposed into the radio frames. FIG. 8A to FIG. 8D are schematic diagrams illustrating a disposing mechanism of the resource units according to an embodiment of the disclosure.

Referring to FIG. 8A to FIG. 8D, in the condition of $N_i^{SC}=3$, the next resource unit is represented by a block filled with slash drawn to the lower right, which is similar to patterns shown according to FIG. 5. With presence of existing used or forbidden spectrum resources, the disposing position type 20b of 3 tones has four disposing positions. With an estimated end time point after disposition as a reference, a remaining area not being used is calculated for each of the four disposing positions. The larger remaining area indicates a greater degree of wastes. Therefore, in the step S30, the disposing position of the resource units is determined according to the remaining area. Here, the option being selected is the remaining area of FIG. 8C.

FIG. 9A to FIG. 9D are schematic diagrams illustrating a comparison between disposition of the resource units and allowed delay time according to an embodiment of the disclosure. Referring to FIG. 9A to FIG. 9D, in addition to the consideration regarding the remaining area in step S30, after disposition of the resource units, the remaining spectrum resource after scheduling extends to one time point on a time distribution in the step S40. As such, it is required to further confirm whether an end time point exceeds a time delay constraint 50 of the user equipment. In this example, although the minimized remaining area may be obtained with the disposing position of FIG. 9B, the disposing position of FIG. 9B does not satisfy the requirement of the time delay constraint 50 since the end time point exceeds the time delay constraint 50. Therefore, a determining result of the step S40 is "False".

Figure 10:
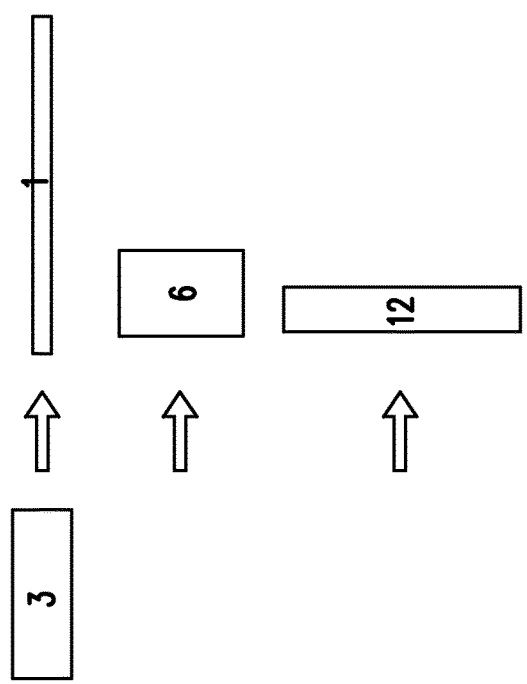
FIG. 10 is a schematic diagram illustrating a mechanism for changing a resource unit type according to an embodiment of the disclosure.

Next, since the determining result is "False" in the step S40, the method proceeds to a step S50, in which the resource unit type is changed (i.e., the tone number is changed). FIG. 10 is a schematic diagram illustrating a mechanism for changing a resource unit type according to an embodiment of the disclosure. Referring to FIG. 10 with the resource unit type currently being 3 tones, such option may be changed to the options of single tone, 6 tones or 12 tones based on the options in FIG. 5 before looping back the step S30 for re-disposition.

A changing order may be determined according to, for example, a cost ratio. In the condition where allowable tone options are of 1, 3, 6 and 12, owing to the fact that 3 tones, 6 tones and 12 tones have the same energy consumption, there is not particular limitation on those options as long as the delay constraint can be satisfied (e.g., a smaller one or a greater one of any two of the options can be select first). The option of single tone is the secondary choice since it will change the energy consumption currently being used.

Figure 11A:
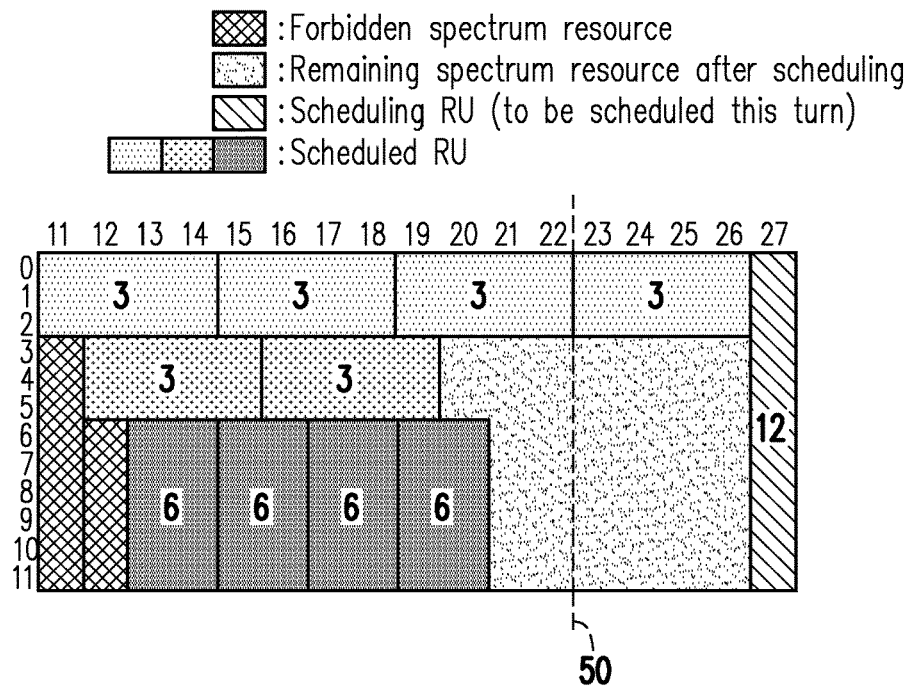
FIG. 11A to FIG. 11C are schematic diagrams illustrating acceptable disposing positions of the resource units after the type is changed according to an embodiment of the disclosure.
Figure 11B:
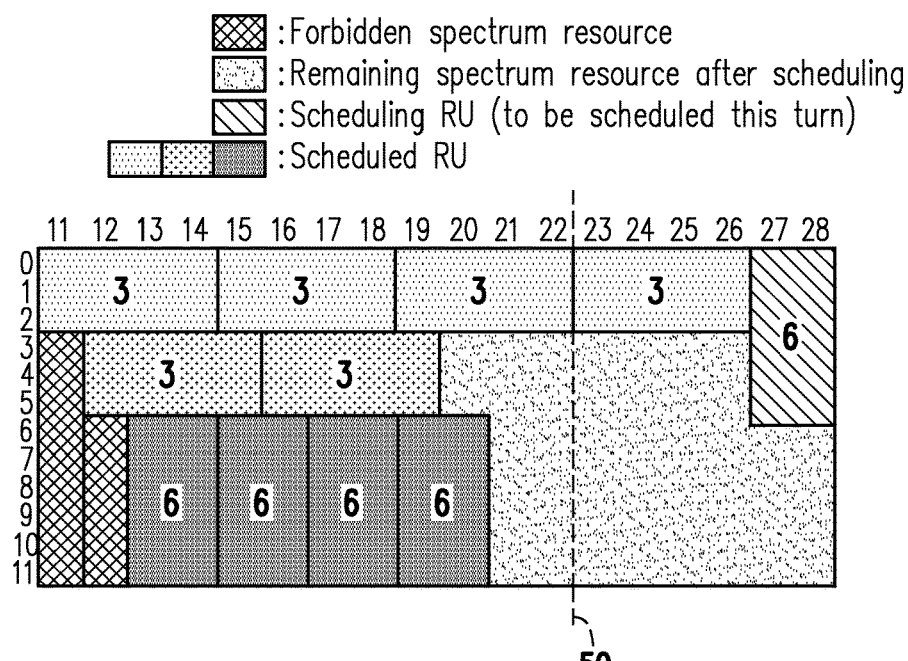
Figure 11C:
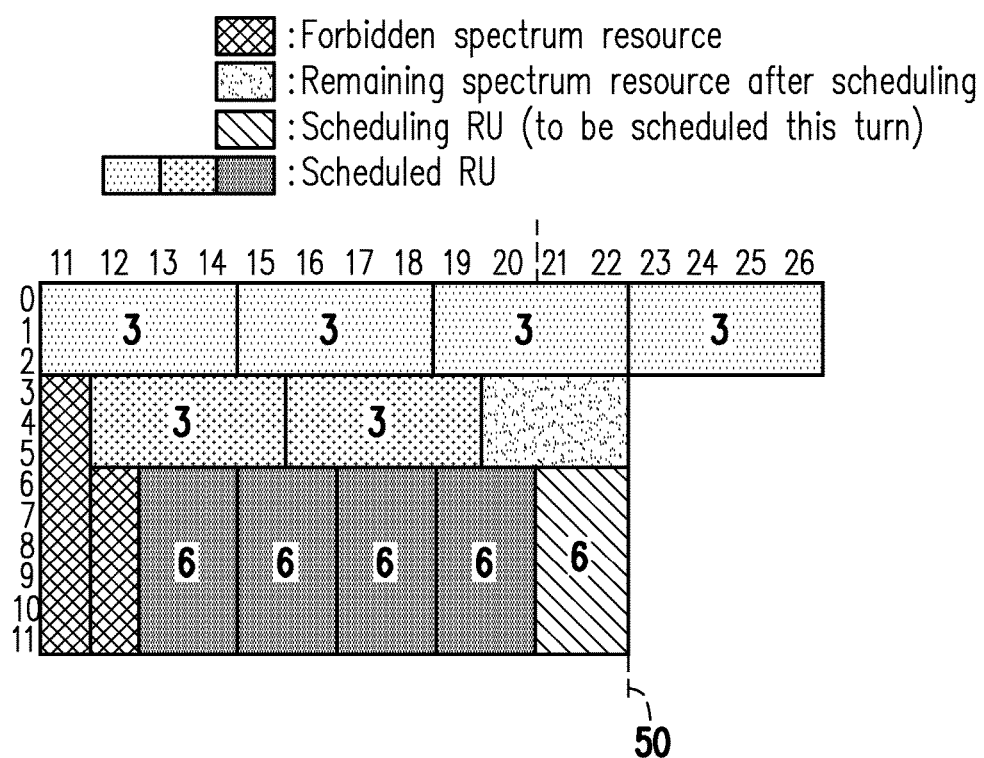

FIG. 11A to FIG. 11C are schematic diagrams illustrating acceptable disposing positions of the resource units after the type is changed according to an embodiment of the disclosure. Referring to FIG. 11A, if the option is changed to 12 tones, there will only be one disposing position, which will not be selected when exceeding the time delay constraint 50. If the option is changed to 6 tones, there will be two disposing positions, as shown by FIG. 11B and FIG. 11C. The first six subcarriers obtained from the disposition position of FIG. 11B fail to satisfy the time delay constraint 50. The first six subcarriers obtained from the disposition position of FIG. 11C can satisfy the time delay constraint 50 while having the minimized remaining area. Therefore, the disposing position of FIG. 11C is eventually selected so a more preferable use efficiency can be provided.

In this way, through a loop of S30, S40 and S50, the scheduling of the resource units during the uplink transmission may then be achieved. Under the framework of the NB-IoT specification, the disclosure schedules resource allocation to effectively use the bandwidth, save energy and maintain favorable transmission reliability.

Figure 12:
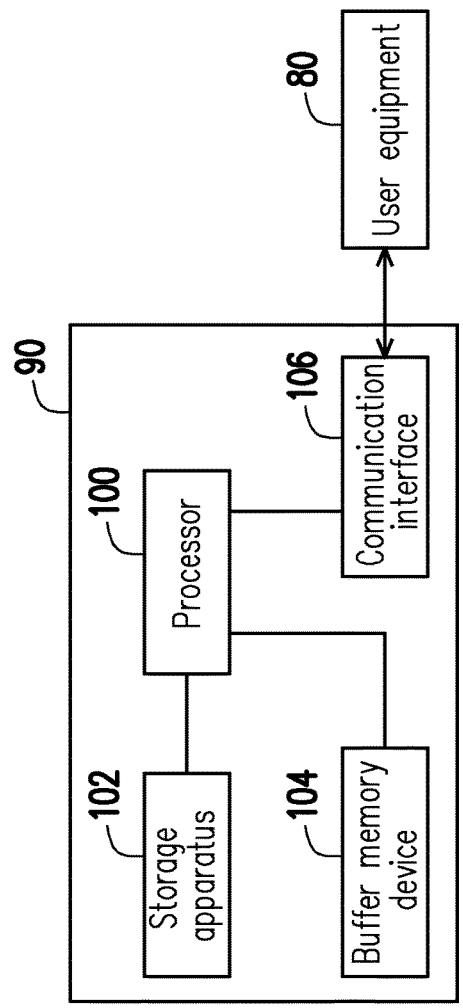
FIG. 12 is a schematic diagram illustrating a structure of a base station server system according to an embodiment of the disclosure.

By doing so, a system equipment for the scheduling method of uplink resource unit may be realized, and disposed in, for example, the base station server system. FIG. 12 is a schematic diagram illustrating a structure of a base station server system according to an embodiment of the disclosure.

Referring to FIG. 12, a base station server system 90 includes a processor 100, which is configured to perform a management on a communication with a user equipment 80. A storage apparatus 102 can at least store firmware or software required by the management performed by the processor. A buffer memory device 104 can be used to temporarily store data required in operations of the processor. A communication interface 106 can provide an interface for communicating with the user equipment 80. According to the NB-IoT specification, the processor 100 can perform an uplink resource unit scheduling, which includes the followings. An uplink parameter set is selected and calculated according to a traffic and a Quality of Service (QoS) allowed by the user equipment 80 so the uplink parameter set can achieve a minimized energy consumption. Here, the uplink parameter set includes parameters of various allowed transmission variations including a number of scheduled resource units ($N^{RU}$), a number of repetitions ($N^{rep}$), a modulation coding scheme (MCS), and a number of consecutive subcarriers used ($N^{SC}$). A score function is used to calculate a score for each device (the user equipment) and a transmission order of the device is determined according to the score. A disposing position of the resource units in uplink subcarriers is determined, wherein a position where a remaining area of an effective resource unit being the minimized is selected as the disposing position. The time occupied by the disposing position is checked to see whether or not a delay constraint allowed by the user equipment 80 is satisfied. If a result of checking the disposing position satisfies the delay constraint, an uplink resource unit scheduling is completed. If the result of checking the disposing position does not satisfy the delay constraint, the number of consecutive subcarriers is changed and the step of determining the disposing position of the resource units in the uplink subcarriers is looped back and performed.

The NB-IoT technique of the disclosure is an uplink data transmission method with high reliability and power saving that provides a more preferable combination in terms of the number of repetitions and the resource unit type. Moreover, with proper combination of MCS and power selection, transmission efficiency can be improved while maintaining energy conservation.

Although the present disclosure has been described with reference to the above embodiments, it is apparent to one of the ordinary skill in the art that modifications to the described embodiments may be made without departing from the spirit of the present disclosure. Accordingly, the scope of the present disclosure will be defined by the attached claims not by the above detailed descriptions.

What is claimed is:

1. A scheduling method of uplink resource units between a user equipment and a base station server system in Narrow Band Internet of Thing (NB-IoT), comprising:
calculating an uplink parameter set having a minimized energy consumption according to a traffic and a QoS allowed by the user equipment, wherein the uplink parameter set comprises parameters of a plurality of allowed transmission variations including a number of scheduled resource units ($N^{RU}$), a number of repetitions ($N^{rep}$), a number of consecutive subcarriers ($N^{SC}$) used by the resource units and a modulation coding scheme (MCS);
calculating a score of a transmission condition variation of the user equipment by using a score function and determining a transmission order of the user equipment according to the score;
determining the user equipment currently having a highest score for performing a transmission;
determining a disposing position of the resource units in uplink subcarriers such that a remaining area of effective resource units is minimized; and
checking a transmission time of the disposing position, and changing the number of consecutive subcarriers when the transmission time does not satisfy a delay constraint, wherein the step of determining the disposing position of the resource units in the uplink subcarriers is looped back and performed with an energy consumption used by the resource unit being not changed as a higher priority, and the uplink resource unit scheduling is completed when the checking result satisfies the delay constraint.

2. The scheduling method of uplink resource units according to claim 1, wherein the step of calculating the uplink parameter set having the minimized energy consumption comprises:
calculating the number of scheduled resource units ($N^{RU}$) according to a data size;
calculating a successful transmission probability ($P^S$) according to the data size and a bit error rate;
according to a reliability goal of the user equipment and the successful transmission probability, estimating the number of repetitions ($N^{rep}$) satisfying the reliability goal;
determining a transmission power (Pi) of the user equipment according to a range of a receivable power;
calculating a plurality of products of an energy consumption (Ei) according to parameters of the allowed transmission variations including the transmission power (Pi), a number of data slots ($N^{slot}$), the number of repetitions ($N^{rep}$) and the number of scheduled resource units ($N^{RU}$); and
determining a lowest product among the products of the energy consumption (Ei) to be the uplink parameter set.

3. The scheduling method of uplink resource units according to claim 1, wherein calculating the score of the transmission condition variation of the user equipment using the score function, and the score is lower when options of the transmission condition variation are more.

4. The scheduling method of uplink resource units according to claim 3, wherein the step of calculating the score further comprises merging by weights according a time emergency parameter.

5. The scheduling method of uplink resource units according to claim 1, wherein the step of determining the disposing position of the resource units in the uplink subcarriers comprises:
according to the number of consecutive subcarriers ($N^{SC}$) of the resource units to be transmitted and subcarrier ranges used for wirelessly transmitting data frames, sequentially disposing the resource unit to each of different positions within the subcarrier ranges within an end time point to generate a plurality of the remaining area, and the disposing position is determined as the remaining area is minimized.

6. The scheduling method of uplink resource units according to claim 1, wherein the step of checking the transmission time of the disposing position comprises:
comparing an end transmission time with the delay constraint of the user equipment according to the determined disposing position, and determining that the delay constraint is satisfied when the end transmission time is less than or equal to the delay constraint.

7. The scheduling method of uplink resource units according to claim 1, wherein if a result of checking the disposing position does not satisfy the delay constraint, the step of changing the number of the consecutive subcarriers is to select a different option from a plurality of options for the number of consecutive subcarriers determined according to a transmission specification.

8. The scheduling method of uplink resource units according to claim 7, wherein in a subcarrier bandwidth specification of 15 kHz, a number of subcarriers assignable for one of the resource units includes four options of 1, 3, 6 and 12, one of the four options of 1, 3, 6 and 12 different from a current option is selected with the option of the number of the subcarriers being 1 as a last option to be considered.

9. A base station server system, comprising:
a processor, configured to perform a management on a communication with a user equipment,
a storage apparatus, at least storing firmware or software required by the management performed by the processor;
a buffer memory device, configured to temporarily store data required in operations of the processor; and
a communication interface, providing an interface for communicating with the user equipment,
wherein according to an NB-IoT specification, the processor performs an uplink resource units scheduling, including:
calculating an uplink parameter set having a minimized energy consumption according to a traffic and a QoS allowed by the user equipment, wherein the uplink parameter set comprises parameters of a plurality of allowed transmission variations including a number of scheduled resource units ($N^{RU}$), a number of repetitions ($N^{rep}$), a number of consecutive subcarriers ($N^{SC}$) used by the resource units and a modulation coding scheme (MCS);
calculating a score of a transmission condition variation of the user equipment by using a score function and determining a transmission order of the user equipment according to the score;
determining the user equipment currently having a highest score for performing a transmission;

determining a disposing position of the resource units in uplink subcarriers such that a remaining area of effective resource units is minimized; and checking a transmission time of the disposing position, and changing the number of consecutive subcarriers when the transmission time does not satisfy a delay constraint, wherein the step of determining the disposing position of the resource units in the uplink subcarriers is looped back and performed with an energy consumption used by the resource unit being not changed as a higher priority, and the uplink resource units scheduling is completed when the checking result satisfies the delay constraint.

10. The base station server system according to claim 9, wherein calculating the uplink parameter set comprises:

calculating the number of scheduled resource units ($N^{RU}$) according to a data size;

calculating a successful transmission probability ($P^S$) according to the data size and a bit error rate;

according to a reliability goal of the user equipment and the successful transmission probability, estimating the number of repetitions ($N^{rep}$) satisfying the reliability goal;

determining a transmission power (Pi) of the user equipment according to a range of a receivable power;

calculating a plurality of products of an energy consumption (Ei) according to parameters of the allowed transmission variations including the transmission power (Pi), a number of data slots ($N^{slot}$) the number of repetitions ($N^{rep}$) and the number of scheduled resource units ($N^{RU}$); and determining a lowest product among the products of the energy consumption (Ei) to be the uplink parameter set.

11. The base station server system according to claim 9, wherein calculating the score of the user equipment by using the score function, the score is lower when options of the transmission condition variations are more.

12. The base station server system according to claim 11, wherein the step of calculating the score further comprises merging by weights according to a time emergency parameter.

13. The base station server system according to claim 9, wherein determining the disposing position of the resource units in the uplink subcarriers comprises:

according to the number of consecutive subcarriers ($N^{SC}$) of the resource units to be transmitted next time and subcarrier ranges used for wirelessly transmitting data frames, sequentially disposing the resource units to each of different positions within the subcarrier ranges within an end time point to generate a plurality of the remaining area, and the disposing position is determined as the remaining area is minimized.

14. The base station server system according to claim 9, wherein checking the transmission time of the disposing position comprises:

comparing an end transmission time with the delay constraint of the user equipment according to the determined disposing position, and determining that the delay constraint is satisfied when the end transmission time is less than or equal to the delay constraint.

15. The base station server system according to claim 9, wherein if a result of checking the transmission time of the disposing position does not satisfy the delay constraint, wherein changing the number of the consecutive subcarriers is to select a different option from a plurality of options for the number of consecutive subcarriers determined according to a transmission specification.

16. The base station server system according to claim 15, wherein in a subcarrier bandwidth specification of 15 kHz, a number of subcarriers assignable for one of the resource units includes four options of 1, 3, 6 and 12, one of the four options of 1, 3, 6 and 12 different from a current option is selected with the option of the number of the subcarriers being 1 as a last option to be considered.

* * * * *